United States Patent [19]

Pinson

[11] Patent Number: 4,735,296

[45] Date of Patent: Apr. 5, 1988

[54] ACTIVE VIBRATION STABILIZER AND ISOLATOR

[75] Inventor: George T. Pinson, Huntsville, Ala.

[73] Assignee: The Boeing Company, Seattle, Wash.

[21] Appl. No.: 936,935

[22] Filed: Dec. 1, 1986

Related U.S. Application Data

[63] Continuation of Ser. No. 711,266, Mar. 13, 1985, abandoned, which is a continuation-in-part of Ser. No. 430,344, Sep. 30, 1982, abandoned, which is a continuation-in-part of Ser. No. 430,348, Sep. 30, 1982, abandoned.

[51] Int. Cl.[4] .................. F16F 7/10; F16M 13/00; F16M 7/00
[52] U.S. Cl. .................................. 188/379; 248/550; 248/562; 267/136
[58] Field of Search ............. 188/1.11, 152, 268, 188/275, 279, 322.5, 379, 380, 378; 267/136; 244/17.25, 17.27, 17.13; 248/550, 571, 583, 631, 638, 562

[56] References Cited

U.S. PATENT DOCUMENTS

| | | | |
|---|---|---|---|
| 2,459,663 | 1/1949 | Majneri | 188/152 |
| 2,964,272 | 12/1960 | Olson | 248/550 |
| 3,216,679 | 11/1965 | Curwen | 248/550 |
| 3,464,657 | 9/1969 | Bullard | 188/1.11 |
| 3,566,993 | 3/1971 | Leatherwood et al. | 188/379 |
| 3,606,233 | 9/1971 | Scharton et al. | 244/17.25 X |
| 3,701,499 | 10/1972 | Schubert et al. | 248/550 X |
| 3,952,979 | 4/1976 | Hansen | 248/550 |
| 4,033,541 | 7/1977 | Malueg | 248/550 |
| 4,328,941 | 5/1982 | Phillips et al. | 248/550 |
| 4,360,184 | 11/1982 | Reid, III | 248/631 X |
| 4,387,886 | 6/1983 | Schlegel et al. | 248/631 X |
| 4,531,699 | 7/1985 | Pinson | 248/550 |

Primary Examiner—Andres Kashnikow
Assistant Examiner—Robert J. Oberleitner
Attorney, Agent, or Firm—Finnegan, Henderson, Farabow, Garrett & Dunner

[57] ABSTRACT

An active vibration stabilizer and isolator for removing vibration between a fixed support and a payload. The vibration stabilizer and isolator adaptable for use with large and heavy payloads or closed cycle applications where a hard or uncompressible stabilizer and isolator is required to isolate vibrations or oscillations from the payload.

4 Claims, 3 Drawing Sheets

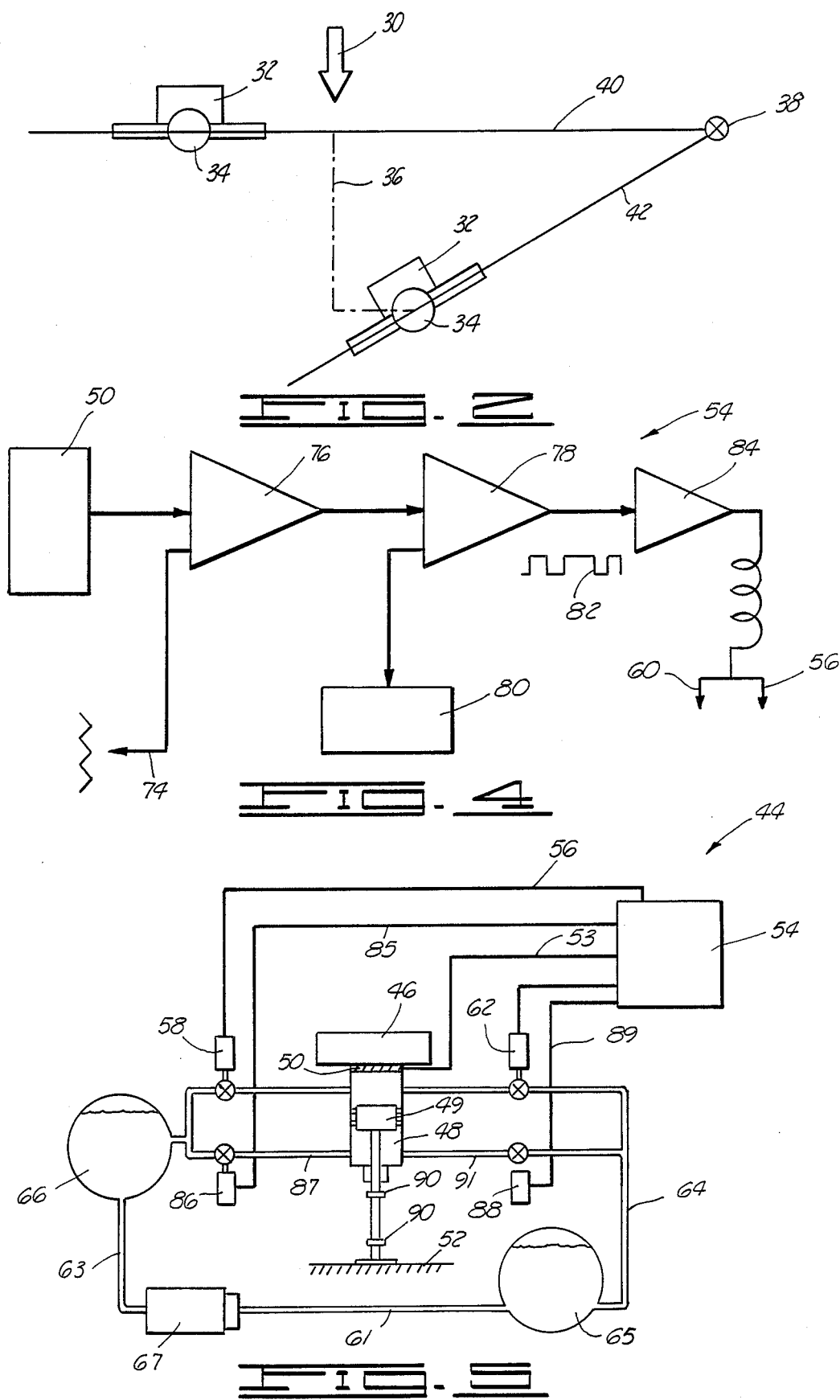

ACTIVE VIBRATION STABILIZER AND ISOLATOR

BACKGROUND OF THE INVENTION

The subject application for patent is a continuation of application Ser. No. 711,266 filed Mar. 13, 1985 which was a continuation-in-part of application, Ser. No. 430,344 filed Sept. 30, 1982 and application, Ser. No. 430,348 filed Sept. 30, 1982 by the subject inventor. These applications are now abandoned.

This invention relates to a vibration isolator and stabilizer and more particularly but not by way of limitation to an active hydraulic and pneumatic vibration stabilizer and isolator used in conjunction with a cylinder and piston with a control system to operate a force sensor to apply constant pressure on the payload thereby eliminating vibration.

Heretofore, in a dynamic environment such as encountered by an aircraft, payload stabilization requires the removal of the vehicle dynamics in the form of pitch, yaw and roll and the effects of vibration along each of these axis. In a non-vibrational dynamic environment, it is difficult to stabilize a payload because of the lag in the measurement, control and stabilization of the system. This is caused by the time required for a sensor such as an accelerometer to measure a force or movement, the control system to interupt the movement or force, and the time required for some stabilization system such as a torquer to react to the commands issued by the control system.

In the real world the ability of a control system with its train of measurement and action devices to control unexpected movement is degraded by vibration in the pitch, yaw and roll direction. These vibrations and unexpected impulses are caused by wind gusts, engine operation and other external and internal sources. Some vibration and impulses are eliminated by the use of shock mounts or other passive devices. The remaining vibrations which can only be partially eliminated by the control system must be tolerated by the payload.

In U.S. Pat. No. 3,566,993 to Leatherwood et al, U.S. Pat. No. 4,328,941 to Phillips, U.S. Pat. No. 3,701,499 to Schuber et al, U.S. Pat. No. 4,387,886 to Schlegel et al, U.S. Pat. No. 2,459,663 to Majheri, U.S. Pat. No. 2,964,272 to Olson, U.S. Pat. No. 3,216,679 to Curwen, U.S. Pat. No. 3,464,657 to Bullard, U.S. Pat. No. 3,606,233 to Schraton et al, U.S. Pat. No. 3,952,979 to Hansen and U.S. Pat. No. 4,033,541 to Malueg various types of active and passive vibration isolators are shown for supporting different types of equipment for isolating different types of vibration. None of these vibration isolators specifically disclose the unique feature of the subject active vibration isolator which in real time will remove vibration, impulses and other low level pitch, yaw and roll motions before they are transferred to the payload.

SUMMARY OF THE INVENTION

The subject invention through the use of a hydraulic cylinder and piston actively removes vibrations and oscillations before they are transmitted to the payload. The isolator responds in an equal rate to the frequency and amplitude of the vibration input.

The subject invention is particularly suited for large, heavy payloads or closed cycle applications where a hard or uncompressible stabilizer and isolator is required.

The isolator further provides means for isolating a vibrating or oscillating payload or other bodies from some other fixed or moving objects to which it is attached.

The active hydraulic and pneumatic vibration stabilizer and isolator is simple in design and is readily adaptable for various types and sizes of payloads subject to vibration. The isolator actively removes vibration impulses and other low level pitch and yaw motions before they are transferred to the payload.

The active vibration isolator for removing vibration between a vibration source and a payload includes a cylinder and piston connected to a fluid reservoir and pump having an inlet and exhaust control valves attached thereto The piston is connected to a fixed support through a piston shaft and ball joint. Disposed between the payload and the cylinder is a force sensor having a feed back line to a control system. The control system is connected to the control valve and measures the amount of force on the force sensor for maintaining a constant force on the force sensor thereby stabilizing the payload.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2 illustrates a payload displacement due to discontinuity.

FIG. 4 illustrates a schematic view of the isolators control system.

FIG. 5 illustrates a schematic view of a double action hydraulic vibration stabilizer and isolator.

DETAILED DESCRIPTION OF THE DRAWINGS

Figure 1:
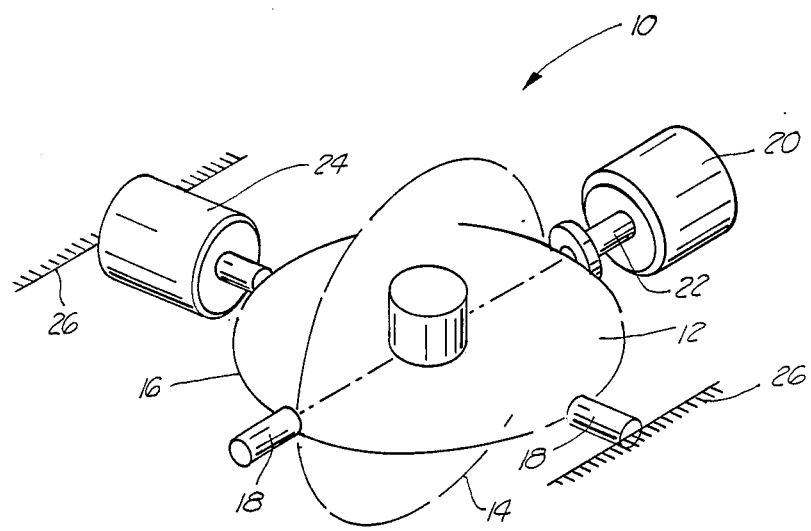
FIG. 1 is a prior art two gimbal stabilization system.

In FIG. 1 a typical prior art two gimbal stabilization system is shown and designated as general reference number 10. The system 10 includes a sensor platform 12 attached to an "X" gimbal ring 14 which may be an integral part of the sensor platform 12. The "X" gimbal ring 14 is attached to a "Y" gimbal ring 16 through a set of bearings 18. An "X" gimbal drive 20 consists of a torquer 22 or digital stepping motor and is attached to the "Y" gimbal ring 16. A "Y" gimbal drive 24 and a "Y" gimbal support 26 are attached to a fixed structure which is not shown in the drawings. Typcially a set of gyros or rate sensors sense a motion in the fixed structure. This information is transmitted to a control system. The control system determines the amount of motion required in the "X" and "Y" gimbals and commands the appropriate amount of motion.

Under the conditions that the sensor platform and its payload have a small mass and a low inertia relative to the power of the gimbal drives, the sensor platform can nominally be moved at a rate of 10 to 20 Hz or slightly larger depending on the design. If the mass or inertia is large, the drive system must be carefully designed if an acceptable response rate is to be obtained. In general, the system 10 can move small lightweight objects rapidly and large heavy objects slowly.

The two gimbal stabilization system described in FIG. 1 although different in appearance from aximuth-elevation, X - Y, and polar-mount designs, suffers from a commond design problem. This problem occurs under two real world conditions. The first condition occurs when the object to be stabilized is large or heavy and subject to vibration with a frequency higher than the response capability of the gimbal system. The second condition occurs when the object to be stabilized becomes displaced in space due to discontinuity in the medium supporting the driver.

In FIG. 2 discontinuity indicated by arrow 30 is shown which effects the position of a payload 32 having a gimbal system 34. This disturbance is caused by vibration shock, potholes, down drafts, control forces or reaction to aerodynamic environments. If the motion which results is a displacement indicated by dotted line 36 which occurs above approximately 20 Hz., current stabilization systems cannot respond fast enough to maintain the payload 32 in a fixed position in space. The circle 38 indicates the target having an original line of sight indicated by line 40. Due to the discontinuity indicated by line 36, the payload 32 takes on a new line of sight indicated by line 42.

Figure 3:
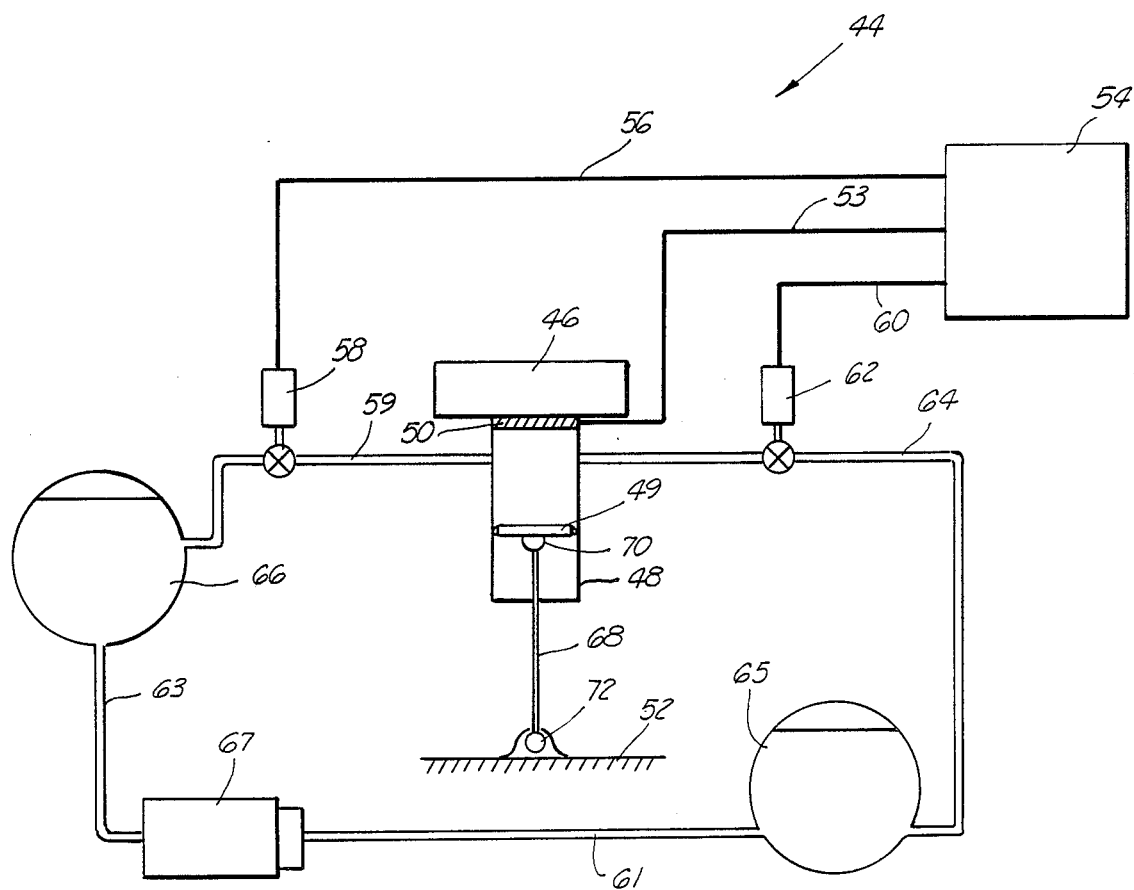
FIG. 3 illustrates a schematic view of a hydraulic vibration stabilizer and isolator.

One embodiment of the invention designated by general reference number 44 stabilizes a payload 46 by actively removing randomly occuring displacements before they are transmitted to the payload. The basic concept is illustrated in FIG. 3. In FIG. 3 the payload 46 is attached to a hydraulic cylinder 48 and piston 49. Under static conditions a force sensor 50 will provide a steady state signal and no control forces are exerted on the payload 46. If a disturbance however occurs in either the payload 46 or in a fixed support 52, the force sensor 50 registers a change of pressure thereon in its output signal. The signal will provide data via feedback line 53 to a control system 54 whereby a determination is made to either increase or decrease the hydraulic pressure to the cylinder 48. If the pressure is to be increased, a command is sent via a control line 56 to a hydraulic inlet control valve 58 which is opened to increase the hydraulic pressure via a line 59 to the cylinder 48. The control system 54 acts to maintain a constant hydraulic fluid pressure in the cylinder 48 for the full extent of the piston 49's travel. If conversely the fixed support 52 is moved closer to the payload 46, the increased pressure is sensed by the force sensor 50 and through the control system 54 and line 60, a hydraulic exhaust control valve 62 is opened and hydraulic fluid is exhausted via line 64 to a low pressure reservoir 65 thereby maintaining constant pressure in the cylinder 48.

The hydraulic fluid is supplied through a high pressure reservoir 66 using a hydraulic pump 67 which through the use of lines 59, 61, 63 and 64 provide a closed pump system for recirculating the hydraulic fluid therein. However, it should be appreciated that an open hydraulic system could be used equally well without departing from the scope of the invention.

Alignment problems between the payload 46, the cylinder 48, the piston 49, a piston shaft 68 and the fixed support 52 make it convenient to provide ball jonts 70 and 72 between the piston 49 and piston shaft 68 and the interface between piston shaft 68 and fixed support 52.

The ball joint connection allows for the receipt of both direct and lateral forces or pressure to be transmitted from the support 52 to the force sensor 50 via the piston 49 and cylinder 48.

The force sensor 50 is not restricted in this invention to a specific type of sensor. The concept will work with any sensor which recognizes relative motion between the payload 46 and the fixed support 52 and more specifically any motion occuring between the cylinder 48 and piston 49. Typical sensors include but are not restricted to piezoelectric, rate sensors, gyros, potentiometers and laser or optical displacement sensors.

In FIG. 4 a simplistic diagram of the electronic control system 54 is illustrated. The force sensor 50 measures the total force acting on the payload 46. A static load adjust 74 permits the establishment of a null position load or force acting on the payload 46. This provides a null point or base line condition to be used for controlling the position of the hydraulic inlet and exhaust valves 58 and 62. The actual force at this time is sent to an amplifier 76 where together with the static measurement from the static load adjust 74 is conditioned for use in a comparator 78 which derives a differential signal and beats the signal against a saw tooth signal generator 80 producing a pulse width modulating signal 82 which is proportional to the error. The pulse width modulation signal 82 drives the valves 58 and 62 through a valve drive 84. The opening or closing of the valves increases or decreases the pressure to the cylinder 48.

FIG. 5 illustrates a double action hydraulic vibration stabilization and isolator which differs from FIG. 3 in the following manner. The fixed support 52 when moved toward the payload 46 increases the pressure in the cylinder 48. This pressure is sensed by the force sensor 50. The control system 54 then opens the exhaust valve 62 to reduce the pressure and simultaneously opens a hydraulic inlet valve 86 via line 85 to pressurize the bottom side of the piston 49 using hydraulic line 87. If the fixed support 52 pulls away from the payload, the pressure measurement by the force sensor 50 decreases and the valve 86 is closed and an exhaust valve 88 via line 89 is opened using hydraulic line 91. Also hydraulic inlet valve 58 is opened while the exhaust valve 62 is closed. The hydraulic cylinder 48 must be sealed to prevent leakage. This is accomplished by using standard sealing technology using "O" rings and other techniques. To solve the offset problem of misalignment between the payload 46 and the fixed support 52 a set of universal joints 90 or their equivalent may be used.

The hydraulic system is a hard stabilization and isolation system. This characteristic makes the hydraulic system 44 operate significantly different than a pneumatic system. The hydraulic system can handle very large and massive payloads weighing many tons or more. There is effectively no upper limit to the payload weight that can be stabilized provided that it is practical to build an active hydraulic stabilization and isolation system 44.

The noncompressibility of the hydraulic fluid also permits a more rapid response to the disturbance to be achieved. This is because the speed of sound in the fluid is much higher than in gases, therefore, the pressure wave travels to the action point much faster than a pneumatic system.

For simplicity a number of inlet and outlet valves are shown in FIGS. 3 and 5. It is noted commercial high speed three and four way valves can be obtained offthe-shelf which will greatly simplify the design of the subject invention. Different valves do not effect the basic principle of this invention.

A second embodiment of the invention designated by general reference numeral 92 stabilizes the same payload 46 by actively removing randomly occuring displacements before they are transmitted to the payload 46. The basic concept is illustrated in FIG. 6 and is similar to the isolator 44 but for the use of pneumatic power rather than hydraulic pressure.

Figure 6:
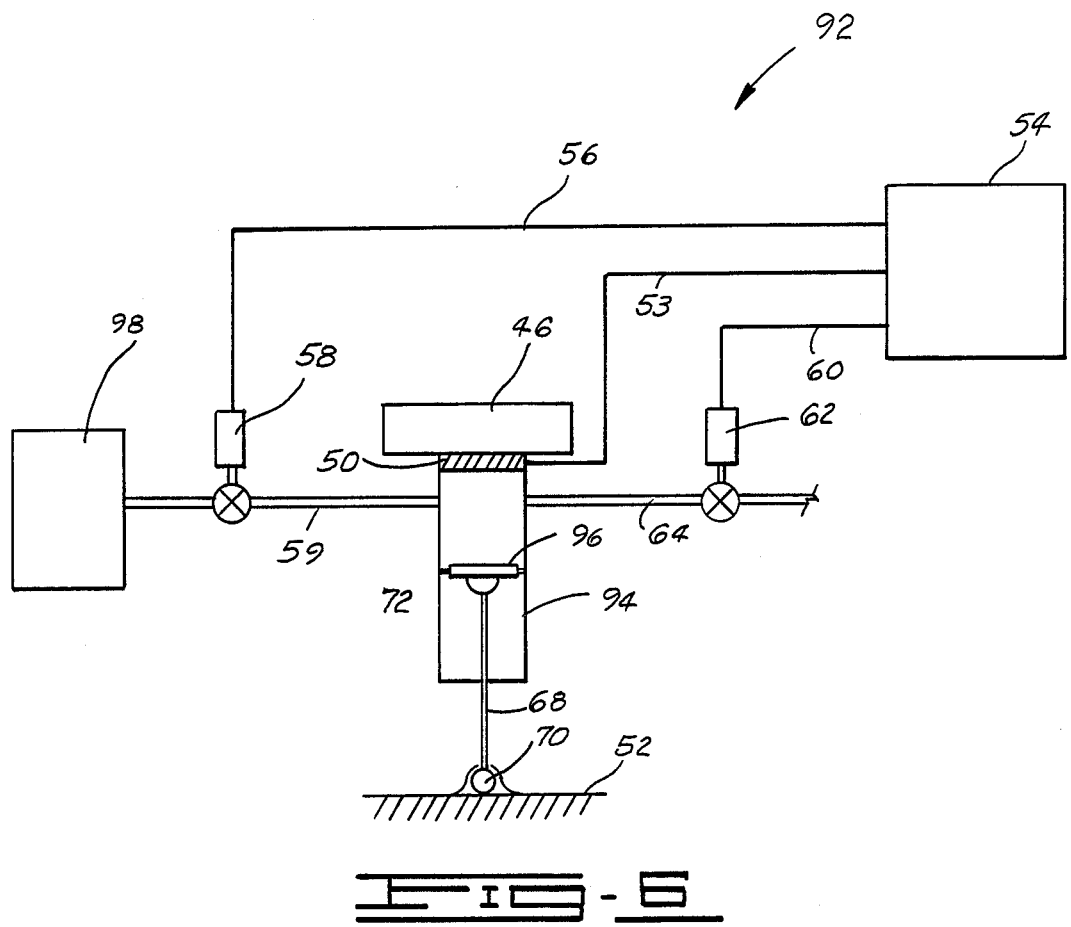
FIG. 6 illustrates a schematic view of a pneumatic vibration stabilizer and isolator.

In FIG. 6 the payload 46 is attached to a pneumatic cylinder 94 and piston 96. Under static conditions the force sensor 50 will provide a steady state signal and no control forces are exerted on the payload 46. If a disturbance however occurs in either the payload 46 or in the fixed support 52, the force sensor 50 registers a change in its output signal. This signal will provide data via feedback line 53 to the control system 54 whereby a determination is made to either increase or decrease gas pressure to the cylinder 48. If the pressure is to be increased, a command is sent via a control line 56 to inlet control valve 58 which is opened to increase gas pressure via line 59 in the cylinder 48. The control system 54 acts to maintain a constant gas pressure in the cylinder 48 for the full extent of the piston 49's travel. If conversely the fixed support 52 is moved closer to the payload 46, the increased pressure is sensed by the force sensor 50 and through the control system 54, and line 60, the control valve 62 is opened and gas exhausted via line 64 thereby maintaining constant pressure in the cylinder 48.

A gas supply 98 may be provided by a high pressure cylinder or by an active pump. The type of gas used does not effect the operation of the subject invention.

Alignment problems between the payload 46, the cylinder 94, the piston 96, a piston shaft 68 and the fixed support 52 makes it convenient to provide ball joints 70 and 72 between the piston shaft 68 and fixed support 52 interface and between the piston 94 and the piston shaft 68. This arrangement allows for both direct and lateral forces to be measured by the sensor 50.

The force sensor 50 is not restricted in this invention to a specific type of sensor. The concept will work with any sensor which recognizes relative motion between the payload 46 and the fixed support 52 and more specifically any motion occuring between the cylinder 48 and piston 49.

Figure 7:
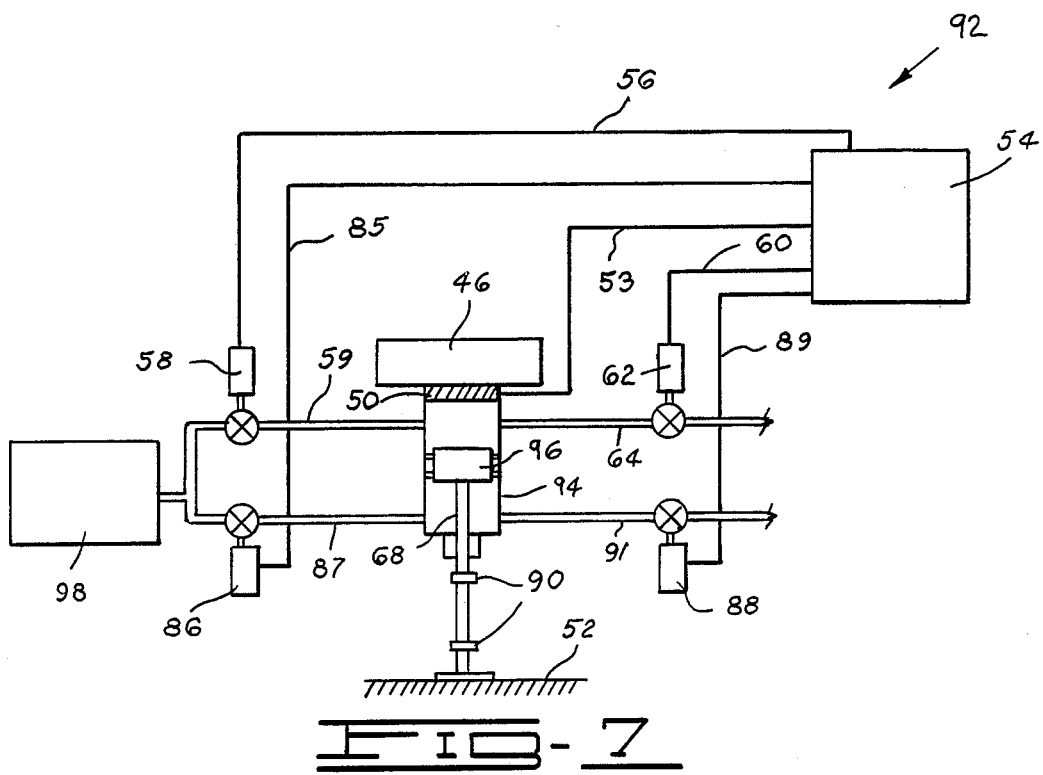
FIG. 7 illustrates a schematic view of a double action pneumatic vibration stabilizer and isolator.

FIG. 7 illustrates a double action pneumatic vibration stabilization and isolator which differs from FIG. 6 in the following manner. The fixed support 52 when moved toward the payload 46 increases pressure in the cylinder 94. This pressure is sensed by the force sensor 50. The control system 54 then opens the exhaust valve 62 to reduce the pressure and simultaneously opens the inlet valve 86 via line 85 to pressurize the bottom side of the cylinder 94 using gas line 87. If the fixed support 52 pulls away from the payload, the pressure measurement by the force sensor 50 decreases and the valve 86 is closed and the exhaust valve 88 via line 89 is opened using gas line 91. Also gas inlet valve 58 is opened while the exhaust valve 62 is closed. The pneumatic cylinder 94 must be sealed to prevent leakage. This is accomplished by using standard sealing technology using "O" rings and other techniques. To solve the offset problem of misalignment between the payload 46 and the fixed support 52 a set of universal joints 90 or their equivalent may be used.

A characteristic of the isolator 92 shown in FIG. 7 is that it is a soft stabilization and isolation system. This impacts the system in that since the gas is a compressible fluid, shock and vibrations are attenuated as the gas is compressed and rarefied. This effect lessens the intensity of low level vibrations and reduces low amplitude vibrations. Further the system is also unique in that large forces can be obtained in a small package as contrasted to electromagnetic devices. In addition, the effective piston movement can be several inches as contrasted to a few tenths of an inch for electromagnetic devices.

Changes may be made in the construction and arrangement of the parts or elements of the embodiments as described herein without departing from the spirit or scope of the invention defined in the following claims.

What is claimed is:

1. An active vibration isolator for disposition between a support and a payload, said isolator comprising:
    a cylinder having an axis and being disposed for supporting said payload on one end thereof;
    a piston disposed for axial movement in said cylinder, said piston defining in said cylinder a first chamber proximate said one end and a second chamber proximate the other end;
    a piston rod extending through the other end of said cylinder between said piston and said support;
    ball joint means connecting said piston rod to said piston and to said support for permitting relative movement between said piston and support in a plane generally perpendicular to said axis;
    means communicating with said cylinder for conducting fluid to an from said first chamber;
    means in said cylinder at said one end for sensing changes in pressure of the fluid in said first chamber caused by relative motion between said piston and cylinder and for generating signals representative of said changes in pressure; and
    means responsive to said signals and operatively connected to said conducting means for maintaining a predetermined substantially constant pressure in said first chamber.

2. The isolator of claim 1 wherein said fluid is hydraulic liquid.

3. The isolator of claim 1 wherein said fluid is a gas.

4. The isolator of claim 1 wherein said conducting means is in communication with each of said first and second chambers and wherein said maintaining means controls said conducting means to maintain substantially constant pressure in both said chambers.

* * * * *

UNITED STATES PATENT AND TRADEMARK OFFICE
CERTIFICATE OF CORRECTION

PATENT NO. : 4,735,296

DATED : April 5, 1988

INVENTOR(S) : GEORGE T. PINSON

It is certified that error appears in the above-identified patent and that said Letters Patent is hereby corrected as shown below:

```
Column 5, line 6, "occuring" should be --occurring--;

Column 5, line 46, "occuring" should be --occurring--.
```

Signed and Sealed this

Eleventh Day of April, 1989

Attest:

DONALD J. QUIGG

Attesting Officer

Commissioner of Patents and Trademarks